United States Patent
Yontz et al.

(10) Patent No.: US 10,414,032 B2
(45) Date of Patent: Sep. 17, 2019

(54) PUSH-TO-CONNECT FITTING REMOVAL TOOL

(71) Applicant: Conbraco Industries, Inc., Matthews, NC (US)

(72) Inventors: Phillip T. Yontz, Rock Hill, SC (US); Lei Zhang, Tianjin (CN); Jeffrey A. Polofsky, North Myrtle Beach, SC (US)

(73) Assignee: Conbraco Industries, Inc., Matthews, NC (US)

( * ) Notice: Subject to any disclaimer, the term of this patent is extended or adjusted under 35 U.S.C. 154(b) by 252 days.

(21) Appl. No.: 15/459,418

(22) Filed: Mar. 15, 2017

(65) Prior Publication Data
US 2018/0264634 A1  Sep. 20, 2018

(51) Int. Cl.
  *B25B 27/02*  (2006.01)
  *B25B 27/10*  (2006.01)
  (Continued)

(52) U.S. Cl.
  CPC .............. *B25B 27/02* (2013.01); *B25B 7/02* (2013.01); *B25B 7/12* (2013.01); *B25B 27/10* (2013.01); *F16L 37/0915* (2016.05)

(58) Field of Classification Search
  CPC ......... B25B 27/02; B25B 27/10; B25B 27/16; B25B 7/00; B25B 7/02; B25B 7/04; B25B 7/12; B25B 7/18; B25B 7/22; B25B 7/14
  See application file for complete search history.

(56) References Cited

U.S. PATENT DOCUMENTS 2,373,478 A * 4/1945 Kuhn .................. B25B 27/0085
  254/122
3,845,538 A  11/1974 Demler, Sr.
(Continued)

FOREIGN PATENT DOCUMENTS

| DE | 155375 C | 6/1901 |
| DE | 959810 C | 3/1957 |
| DE | 14419862 C1 | 11/1995 |

OTHER PUBLICATIONS

Communication Issued by the European Patent Office enclosing an extended European Search report for EP17168118.2 dated Nov. 27, 2017 (7 pgs.).

*Primary Examiner* — Tyrone V Hall, Jr.
(74) *Attorney, Agent, or Firm* — Shumaker, Loop & Kendrick, LLP

(57) ABSTRACT

A push-to-connect fitting removal tool that includes first and second handles pivotally-connected for being grasped and manually moved towards and away from each other, a first guide bar connected to both the first and second handles, and a second guide bar connected to both the first and second handles and cooperating with the first guide bar for converting pivotal movement of the first and second handles into non-pivoting, translation motion of the first and second guide bars. A push fitting jaw is attached to the first guide bar and a pipe jaw is attached to the second guide bar for being moved towards and away from each other as the first and second handles are moved towards and away from each other. The push fitting jaw is adapted for at least partially encircling the push fitting and the pipe jaw adapted for at least partially encircling the pipe. Grasping the first and second handles and moving them towards each other moves the push fitting jaw and the pipe jaw towards each other, and twisting the push fitting removal tool, pushes the push fitting off of the pipe.

20 Claims, 4 Drawing Sheets

(51) Int. Cl.
 *F16L 37/091* (2006.01)
 *B25B 7/02* (2006.01)
 *B25B 7/12* (2006.01)

(56) References Cited

U.S. PATENT DOCUMENTS

| | | | |
|---|---|---|---|
| 4,185,519 A * | 1/1980 | Hays | B25B 7/14 |
| | | | 74/577 S |
| 4,757,588 A | 7/1988 | Churchich | |
| 5,226,230 A | 7/1993 | Klinger | |
| 5,671,520 A | 9/1997 | Scarborough | |
| 6,314,629 B1 | 11/2001 | Showalter, Sr. et al. | |
| 7,114,229 B1 | 10/2006 | Nago | |
| 7,275,293 B2 | 10/2007 | Wathey | |
| 7,617,580 B2 | 11/2009 | Ellis | |
| 8,341,816 B1 | 1/2013 | Swinford | |
| 8,424,179 B2 | 4/2013 | Webb et al. | |
| 8,978,226 B2 | 3/2015 | Kady et al. | |
| 9,277,992 B2 | 3/2016 | Malmon et al. | |
| 2006/0162509 A1 | 7/2006 | Wang | |
| 2008/0173144 A1* | 7/2008 | Hiller | B25B 7/04 |
| | | | 81/337 |
| 2008/0264216 A1* | 10/2008 | Duffy | B25B 7/12 |
| | | | 81/302 |
| 2008/0314205 A1 | 12/2008 | Feliciano | |

\* cited by examiner

PUSH-TO-CONNECT FITTING REMOVAL TOOL

TECHNICAL FIELD AND BACKGROUND OF THE INVENTION

This invention relates to a tool for removing a push-to-connect type plumbing fitting ("push fittings") from a water pipe. Such push fittings are increasingly used to connect copper, PEX and CPVC pipe, among others. In general, the push fittings have internal components, which will "give" in one direction—the direction whereby the push fitting is pushed onto the end of a pipe to form the connection. If installed correctly, the internal component, for example, a toothed grab ring of the push fitting, bites into the exterior walls of the pipe and, with a rubber O-ring, forms a water-tight seal without the need of adhesives, solder or tools. By design, the push fitting is very resistant to being removed from the pipe by pulling the push fitting in the opposite direction.

PEX pipe is increasingly used for water supply and push fittings are particularly suited to this type of pipe. However, it is frequently necessary to remove the push-to-connect fittings for various reasons, such as repairs or modification of the location of fixtures and appliances to which the pipe is connected. Unless the fittings are removed correctly, damage to the pipe can require that long lengths of the pipe be replaced. This is particularly true when the pipe as originally installed has little or no excess length. For this reason, it is desirable to provide a simple tool to quickly remove a push fitting from a pipe without damage to the pipe.

One such tool is shown in Pub. No. US 2008/0314205 to Feliciano. This tool, which resembles a pair of pliers, has a pair of U-shaped jaws which grip both the pipe and the fitting so that squeezing the handles will compress an internal grab ring, releasing the grip of the teeth and allowing the fitting to be removed. However, as is typical with pliers of many types, as the handles of the pliers are compressed they move in an arc, and the jaws of the pliers likewise move in an arc. This arcuate movement out of perpendicular alignment with the pipe and the fitting can cause the jaws of the pliers to bind against the pipe and/or the fitting, thus preventing sufficient movement of the jaws to permit removal of the fitting. In addition, the Feliciano publication includes a single set of jaws that are integrally formed with the handles, thereby requiring a separate plier with differently sized jaws to remove fittings from differently sized pipes.

SUMMARY OF THE INVENTION

It is therefore an object of the present invention to provide a push-to-connect fitting removal tool.

It is another object of the invention to provide a push-to-connect fitting removal tool that maintains alignment with a pipe and a fitting to be removed from the pipe.

It is another object of the invention to provide a push-to-connect fitting removal tool that can be used to remove different-sized or type of fittings from different-sized or types of pipes by quickly changing the jaws of the tool.

It is another object of the invention to provide a push-to-connect fitting removal tool that has spring-loaded handles for allowing a biased return to an open handle position.

It is another object of the invention to provide a push-to-connect fitting removal tool with handles that can be locked in a desired position between open and closed positions.

These and other objects and advantages of the invention are achieved by providing a push-to-connect fitting removal tool that include a first handle and a second handle pivotally-connected for being grasped and manually moved towards and away from each other. A first guide bar is connected to both the first and second handles and a second guide bar is connected to both the first and second handles and cooperates with the first guide bar for converting pivotal movement of the first and second handles into non-pivoting, translation motion of the first and second guide bars. A push fitting jaw is attached to the first guide bar and a pipe jaw is attached to the second guide bar for being moved towards and away from each other as the first and second handles are moved towards and away from each other. The push fitting jaw is adapted for at least partially encircling the push fitting and the pipe jaw is adapted for at least partially encircling the pipe. Grasping the first and second handles and moving them towards each other moves the push fitting jaw and the pipe jaw towards each other. Twisting the push fitting removal tool pushes the push fitting off of the pipe.

In accordance with another embodiment of the invention, the push fitting jaw is U-shaped for being radially inserted onto the push fitting, and the pipe jaw is U-shaped for being radially inserted onto the pipe.

In accordance with another embodiment of the invention, the first guide bar and the second guide bar include respective guide slots for receiving first and second guide pins that convert pivotal motion of the first and second handles towards and away from each other into translation movement of the push fitting jaw and pipe jaw towards and away from the push fitting and pipe.

In accordance with another embodiment of the invention, the first handle and the second handle are biased in an open position, and a ratchet is carried by one of the first handle and the second handle for locking the first handle and the second handle in a position between an open handle position and a closed handle position.

In accordance with another embodiment of the invention, the tool includes a handle release for releasing the ratchet to allow the first handle and the second handle to return to the biased open position.

In accordance with another embodiment of the invention, the handles are biased by at least one spring.

In accordance with another embodiment of the invention, a ratchet is carried by one of the first handle and the second handle for locking the first handle and the second handle in a position between an open handle position and a closed handle position. The ratchet includes a spring-loaded release lever having a ratchet tooth cooperating with a toothed rack positioned on a corresponding one of the first guide bar and second guide bars, and biased in a locking position with the ratchet tooth engaging the toothed rack.

In accordance with another embodiment of the invention, a first jaw holder is carried by the first guide bar and a second jaw holder is carried by the second guide bar and adapted for releasably carrying respective ones of the push fitting jaw and the pipe jaw.

In accordance with another embodiment of the invention, the push fitting jaw is sized to be received onto a diameter of the push fitting and the pipe jaw is sized to be received onto a diameter of the pipe jaw.

In accordance with another embodiment of the invention, a push-to-connect fitting removal tool is provided that includes a first handle and a second handle pivotally-connected for being grasped and manually moved towards and away from a biased open position to a closed position, and a ratchet carried by one of the first handle and the second handle for locking the first handle and the second handle in a position between an open handle position and a closed handle position. A first guide bar is connected to both the first and second handles and includes a first spring attached by a first end to the first guide bar and by a second end to the first handle.

A second guide bar is connected to both the first and second handles and includes a second spring attached by a first end to the second guide bar and by a second end to the second handle, and cooperates with the first guide bar for converting pivotal movement of the first and second handles into non-pivoting, translation motion of the first and second guide bars, and the first and second springs adapted to bias the handles in an open position. A push-to-connect fitting jaw is attached to the first guide bar and a pipe jaw is attached to the second guide bar for being moved towards and away from each other as the first and second handles are moved towards and away from each other. Grasping the first and second handles and moving them towards each other translates the push fitting jaw and the pipe jaw towards each other while remaining perpendicular to a longitudinal axis of the push fitting and the pipe, and twisting the push fitting removal tool pushes the push fitting off of the pipe.

In accordance with another embodiment of the invention, the first guide bar and the second guide bar include respective first and second guide slots for receiving first and second guide pins carried by respective first and second handles that convert pivotal motion of the first and second handles towards and away from each other into translation movement of the push fitting jaw and the pipe jaw towards and away from the push fitting and the pipe.

In accordance with another embodiment of the invention, the first handle and the second handle are biased in an open position, and a ratchet is carried by one of the first handle and the second handle for locking the first handle and the second handle in a position between an open handle position and a closed handle position.

In accordance with another embodiment of the invention, a handle release is provided for releasing the ratchet to allow the first handle and the second handle to return to the biased open position.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
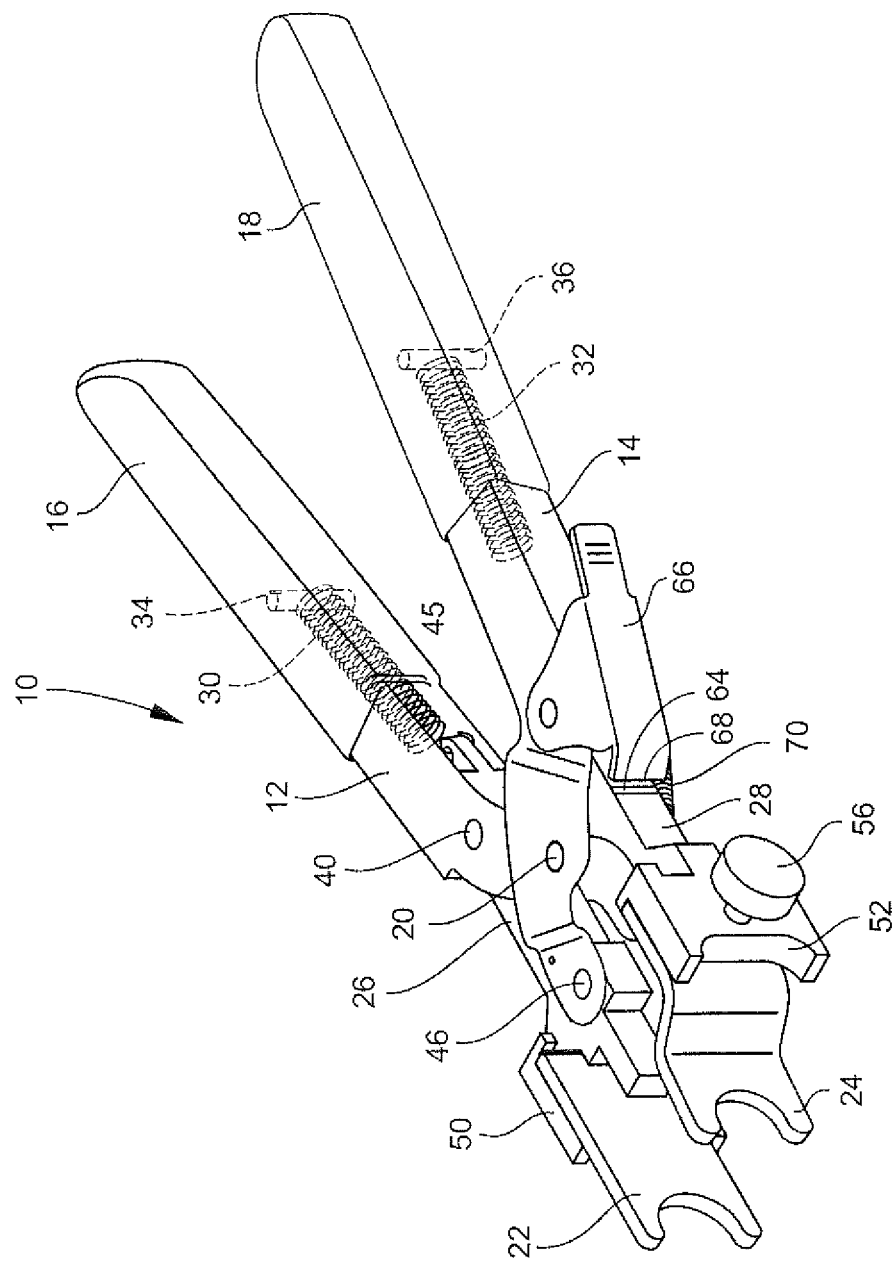
FIG. 1 is a perspective view of a preferred embodiment of a push-to-connect fitting removal tool according to the invention.
Figure 2:
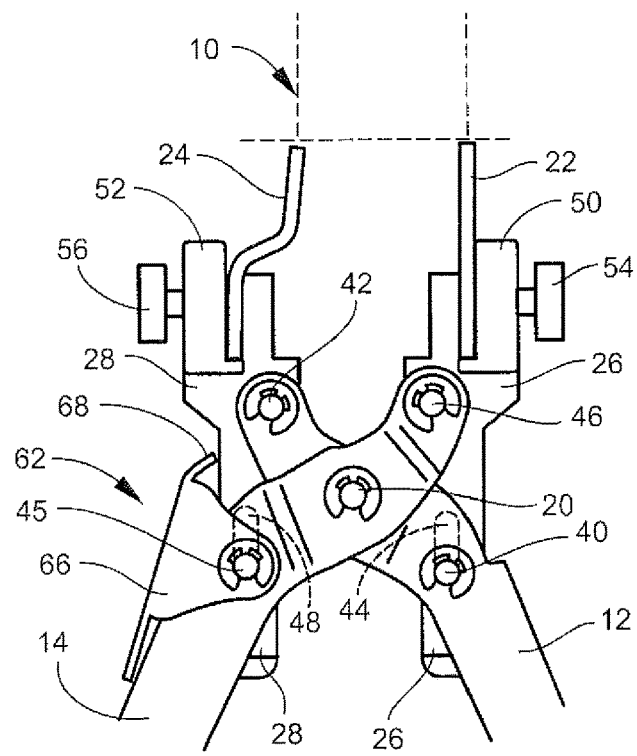
FIGS. 2 and 3 are partial plan views of the tool of FIG. 1, showing the spacing and alignment of the jaws in open and closed positions.
Figure 3:
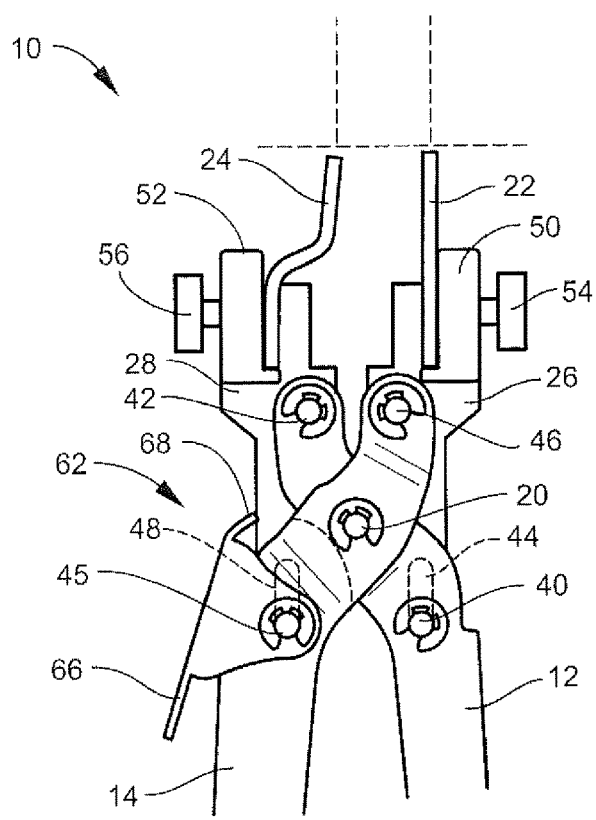

Referring now to FIGS. 1, 2 and 3, a tool for removing a push-to-connect fitting from a pipe is shown and broadly indicated at reference numeral 10. The tool 10 is a plier-type tool that operates manually by grasping the tool 10 in the hand and squeezing two handles 12, 14 together. The handles 12, 14 are preferably covered with non-slip cushion grips 16, 18. The handles 12, 14 are pinned together by a pivot pin 20. Squeezing the handles 12, 14 together thus closes two jaws, a push fitting jaw 22 and a pipe jaw 24, as described further below. The handles 12, 14 are not connected directly to the jaws 22, 24. Rather, a push fitting guide bar 26 is carried on the handle 12 and a pipe guide bar 28 is carried on the handle 14.

One end of the push fitting guide bar 26 is inserted into the hollow end of the handle 12 and is connected to a spring 30, and the pipe guide bar 28 is inserted into the hollow end of the handle 14 and is connected by a spring 32. The other end of the spring 30 is attached to a pin 34 in the handle 12 and the other end of the spring 32 is attached to a pin 36 in the handle 14. Thus, squeezing the handles 12, 14 together elongates the springs 30, 32 and places them under tension. Releasing the handles 12, 14 releases the tension on the springs 30, 32 and returns the handles 12, 14 to a biased, open position, as shown in FIG. 1.

Each guide bar 26, 28 is also attached at two spaced-apart locations along their length. As best shown in FIGS. 2 and 3, the handles 12, 14 have an articulated end that cross over each and are pinned by the pivot pin 20. The push fitting guide bar 26, as noted above, is attached by one end to a pin 34 carried in the handle 12 by which the handle 12 is spring-loaded by a spring 30. The other end of the guide bar 26 is connected to the handle 12 by a pin 40 and to the handle 14 by a pin 42. Similarly, the pipe guide bar 28 is attached by one end to a pin 36 carried in the handle 14 and is spring-loaded by a spring 32. The other end of the guide bar 28 is connected to the handle 14 by a pin 45 and to the handle 12 by a pin 46.

As shown in FIG. 2, the pin 40 is positioned in a guide slot 44 in the guide bar 26, which converts pivotal motion of the handle 12 around the pin 20 into translational motion of the guide bar 26 forwardly away from the handle 12. Similarly, the pin 45 is positioned in a guide slot 48 in the guide bar 28, which translates pivotal motion of the handle 14 around the pin 20 into translational motion of the guide bar 28 forwardly from the handle.

Thus, squeezing the handles 12, 14 together simultaneously translates the guide bars 26, 28 forwardly and in alignment with the orientation of the guide slots 44 and 48.

The push fitting guide bar 26 includes a jaw holder 50 and the pipe guide bar includes a jaw holder 52. Respective thumb screws 54, 56 allow a push fitting jaw 58 and a pipe jaw 60 to be securely held in place when the tool 10 is in use. Because the jaws 22, 24 are removable and replaceable with differently sized or type of jaws, the tool 10 is easily converted to remove different sizes or types of push-to-connect fittings from different sizes of pipes, such as European-style push fittings. Note that the pipe jaw 24 has an offset towards the fitting jaw 22. This permits the correct distance between the jaws 22, 24 to be established without the handles 12, 14 being too far apart to be comfortably gripped and used.

The handles 12, 14 can be locked into a desired position by a ratchet 62 that includes a series of rack teeth 64 formed on an outer surface of the pipe guide bar 28. A spring-loaded release lever 66 with a single ratchet tooth 68 on the end is mounted on the handle 14 by a pin 45 and is biased by a spring 70 into engagement with the rack teeth 64 as the handles 12, 14 are compressed together. Releasing the grip on the handles 12, 14 leaves the handles 12, 14 in the position when released. To allow the handles 12, 14 to release and return to the open position shown in FIG. 1, the release lever 66 is depressed against the handle 14, removing the ratchet tooth 68 from engagement with the rack teeth 64. The spring-loaded handles 12, 14 then return to the open position by the action of the springs 30, 32.

FIGS. 2 and 3 best illustrate operation of the jaws 22, 24. FIG. 2 shows the jaws 22, 24 in the open position in relative alignment with each other and intended to be perpendicular to the longitudinal orientation of the push fitting and the pipe. When closed, FIG. 3, the jaws 22, 24 maintain the same relative alignment with each other and in the intended perpendicular orientation relative to the push fitting "F" and the pipe "P". This enables both the jaws 22, 24 to be easily fitted onto the push fitting "F" and the pipe "P" and, when the jaws 22, 24 close, the same orientation prevents binding of one or both of the jaws 22, 24 against either or both of the push fitting "F" and the pipe "P".

Figure 4:
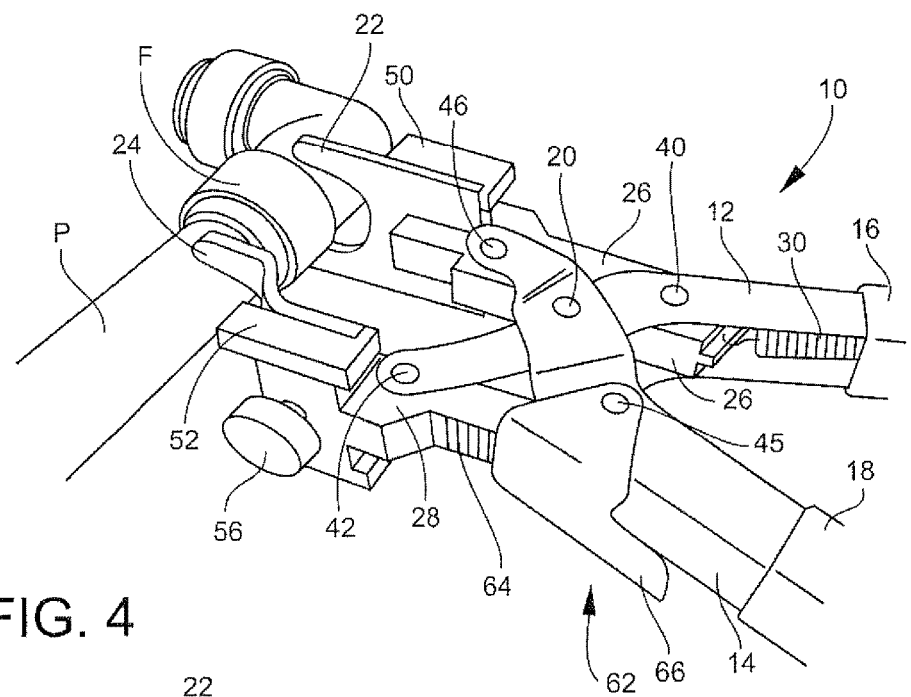
FIG. 4 is a partial perspective view showing initial placement of the tool jaws onto the pipe and fitting to be removed.
Figure 5:
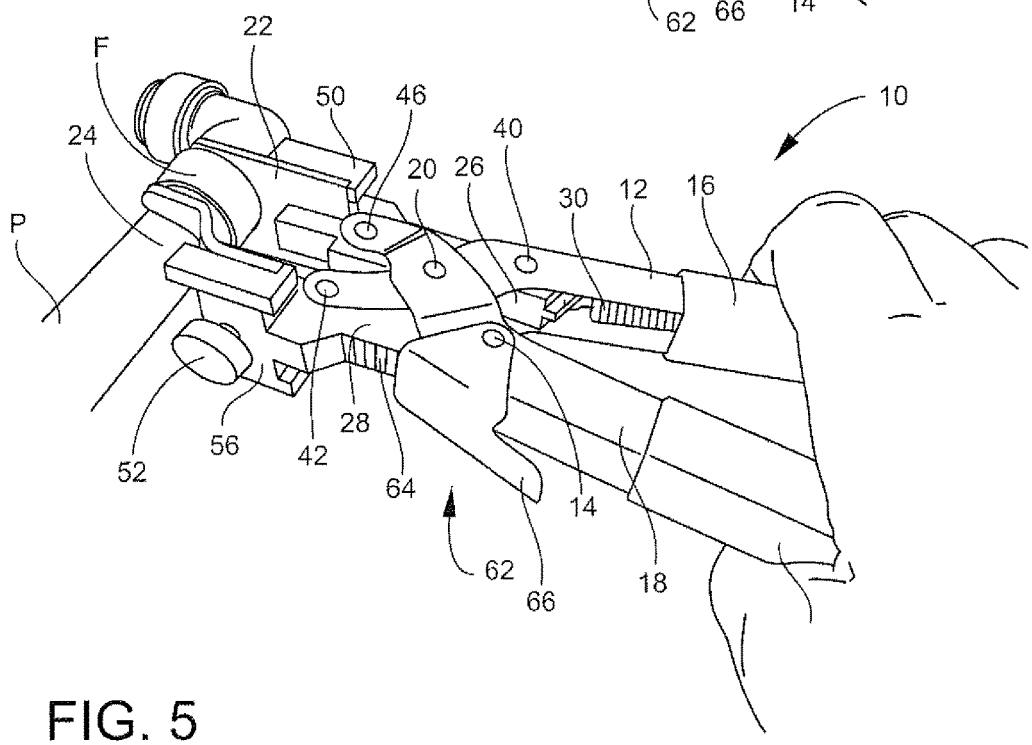
FIG. 5 is a partial perspective view of the tool in place on the pipe and fitting.
Figure 6:
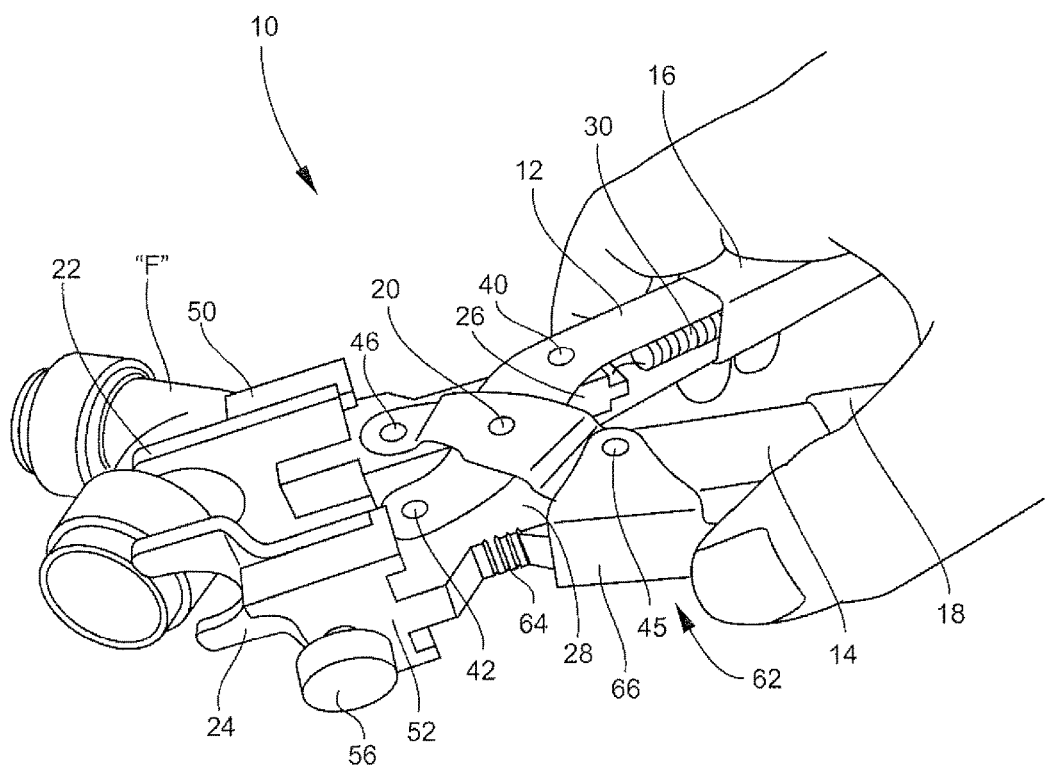
FIG. 6 is a partial perspective view showing removal of the fitting from the pipe.

Referring now to FIGS. 4, 5 and 6, use of the tool 10 to remove a push fitting "F" from a pipe "P" is illustrated. In FIG. 4, and with the jaws 22, 24 and the handles 12, 14 fully open, the larger jaw, the push fitting jaw 22, is placed onto the push fitting "F" and the smaller jaw, the pipe jaw 24, is placed onto the pipe "P" in a position adjacent the push fitting "F". In this position, the handles 12, 14 are compressed together against the counter-tension of the springs 30, 32. The tool 10 is then twisted while the handles 12, 14 are compressed, causing the pipe "P" to be pulled out of the push fitting "F" by the action of the push fitting jaw 22 pressing against the fitting "F" and forcing it off of the end of the pipe "P". The ratchet 62 locks the tool 10 into the removal position. After the push fitting "F" and the pipe "P" have been separated, the handle release lever 66 of the ratchet 62 is depressed, releasing the push fitting "F" from the jaw 22 and releasing the handles 12, 14, which then return to the open position.

Assembly of the tool 10 is accomplished by use of e-clips in a conventional manner. The jaws 22, 24 are easily removable and replaceable with jaws of different sizes or types so that fittings and pipes of differing sizes and/or types can be accommodated with a single tool. Similarly, the jaws 22, 24 are interchangeable left-to-right to permit use on fittings extending in a right hand or left hand direction from a pipe, and to accommodate both right and left hand users.

A tool for removing push-to-connect type plumbing fittings "push fittings" from water pipe as described above. According to the invention have been described with reference to specific embodiments and examples. Various details of the invention maybe changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A push-to-connect fitting removal tool, comprising:
   (a) a first handle and a second handle pivotally connected for being grasped and manually moved towards and away from each other;
   (b) a first guide bar connected to both the first and second handles;
   (c) a second guide bar connected to both the first and second handles and cooperating with the first guide bar for converting pivotal movement of the first and second handles into non-pivoting, simultaneous translation motion of the first and second guide bars towards each other and outwardly from the handles resulting in an overall increase in total length of the tool;
   (d) a push fitting jaw attached to the first guide bar and extending in a planar direction away from a distal end of the first guide bar, a pipe jaw attached to the second guide bar having a first portion extending from a distal end of the second guide bar in a direction away from the distal end of the second guide bar and toward the push fitting jaw, and a second portion extending from the first portion in a direction parallel to the push fitting jaw for being moved towards and away from each other as the first and second handles are moved towards and away from each other; and
   (e) the push fitting jaw adapted for at least partially encircling the push fitting and the pipe jaw adapted for at least partially encircling the pipe, whereby grasping the first and second handles and moving them towards each other moves the push fitting jaw and the pipe jaw towards each other, and twisting the push fitting removal tool, pushes the push fitting off of the pipe.

2. A push-to-connect fitting removal tool according to claim 1, wherein the push fitting jaw is U-shaped for being radially inserted onto the push fitting, and the pipe jaw is U-shaped for being radially inserted onto the pipe.

3. A push-to-connect fitting removal tool according to claim 1, wherein the first guide bar and the second guide bar include respective guide slots for receiving first and second guide pins that convert pivotal motion of the first and second handles towards and away from each other into translation movement of the push fitting jaw and the pipe jaw towards and away from the push fitting and the pipe.

4. A push-to-connect fitting removal tool according to claim 3, and including a ratchet carried by one of the first handle and the second handle for locking the first handle and the second handle in a position between an open handle position and a closed handle position, wherein the ratchet comprises a spring-loaded release lever having a ratchet tooth thereon cooperating with a toothed rack positioned on a corresponding one of the first guide bar and the second guide bar, and biased in a locking position with the ratchet tooth engaging the toothed rack.

5. A push-to-connect fitting removal tool according to claim 1, wherein the first handle and the second handle are biased in an open position, and a ratchet is carried by one of the first handle and the second handle for locking the first handle and the second handle in a position between an open handle position and a closed handle position.

6. A push-to-connect fitting removal tool according to claim 5, and including a handle release for releasing the ratchet to allow the first handle and the second handle to return to the biased open position.

7. A push-to-connect fitting removal tool according to claim 5, wherein the handles are biased by at least one spring.

8. A push-to-connect fitting removal tool according to claim 1, and including a first jaw holder carried by the first guide bar and a second jaw holder carried by the second guide bar and adapted for releasably carrying respective ones of the push fitting jaw and the pipe jaw.

9. A push-to-connect fitting removal tool according to claim 1 wherein the push fitting jaw is sized to be received onto a diameter of the push fitting and the pipe jaw is sized to be received onto a diameter of the pipe jaw.

10. A push-to-connect fitting removal tool according to claim 1, wherein the push fitting jaw is positioned in a push fitting jaw holder connected to the distal end of the first guide bar and secured to the holder by a thumb screw.

11. A push-to-connect fitting removal tool according to claim 1, wherein the pipe jaw is positioned in a pipe jaw holder connected to the distal end of the second guide bar and secured to the holder by a thumb screw.

12. A push-to-connect fitting removal tool, comprising:
 (a) a first handle and a second handle pivotally-connected for being grasped and manually moved towards and away from a biased open position to a closed position, and a ratchet carried by one of the first handle and the second handle for locking the first handle and the second handle in a position between an open handle position and a closed handle position;
 (b) a first guide bar connected to both the first and second handles, and including a first spring attached by a first end to the first guide bar and by a second end to the first handle;
 (c) a second guide bar connected to both the first and second handles and including a second spring attached by a first end to the second guide bar and by a second end to the second handle and cooperating with the first guide bar for converting pivotal movement of the first and second handles into non-pivoting, simultaneous translation motion of the first and second guide bars towards each other and outwardly from the handles resulting in an overall increase in total length of the tool, and the first and second springs adapted to bias the handles in an open position;
 (d) a push-to-connect fitting jaw attached to the first guide bar and extending in a planar direction from a distal end of the first guide bar, a pipe jaw attached to the second guide bar having a first portion extending from a distal end of the second guide bar in a direction toward the push fitting jaw, and a second portion extending from the first portion in a direction parallel to the push fitting jaw for being moved towards and away from each other as the first and second handles are moved towards and away from each other; and
 (e) whereby grasping the first and second handles and moving them towards each other translates the push fitting jaw and the pipe jaw towards each other while remaining perpendicular to a longitudinal axis of the push fitting and the pipe, and twisting the push fitting removal tool pushes the push fitting off of the pipe.

13. A push-to-connect fitting removal tool according to claim 12, wherein the push fitting jaw is U-shaped for being radially inserted onto the push fitting, and the pipe jaw is U-shaped for being radially inserted onto the pipe.

14. A push-to-connect fitting removal tool according to claim 12, wherein the first guide bar and the second guide bar include respective first and second guide slots for receiving first and second guide pins carried by respective first and second handles that convert pivotal motion of the first and second handles towards and away from each other into translation movement of the push fitting jaw and pipe jaw towards and away from the push fitting and the pipe.

15. A push-to-connect fitting removal tool according to claim 14, wherein the first and second guide slots extend along a longitudinal axis of the respective first and second guide bars and receive first and second guide pins carried by respective first and second handles that convert pivotal motion of the first and second handles towards and away from each other into translation movement of the push fitting jaw and pipe jaw towards and away from the push fitting and pipe.

16. A push-to-connect fitting removal tool according to claim 12, wherein the first handle and the second handle are biased in an open position, and a ratchet is carried by one of the first handle and the second handle for locking the first handle and the second handle in a position between an open handle position and a closed handle position.

17. A push-to-connect fitting removal tool according to claim 16, and including a handle release for releasing the ratchet to allow the first handle and the second handle to return to the biased open position.

18. A push-to-connect fitting removal tool according to claim 12, wherein the handles are biased by at least one spring.

19. A push-to-connect fitting removal tool according to claim 12, and including a first jaw holder carried by the first guide bar and a second jaw holder carried by the second guide bar and adapted for releasably carrying respective ones of push fitting jaw and the pipe jaw.

20. A push-to-connect fitting removal tool according to claim 12, wherein the push fitting jaw is sized to be received onto a diameter of the push fitting and the pipe jaw is sized to be received onto a diameter of the pipe jaw.

\* \* \* \* \*